US012561990B2

(12) United States Patent
Mathieu et al.

(10) Patent No.: US 12,561,990 B2
(45) Date of Patent: Feb. 24, 2026

(54) PREVENTING CHEATING OF IN-VEHICLE BREATH ALCOHOL ANALYZER SYSTEM

(71) Applicant: Valeo Comfort and Driving Assistance, Creteil (FR)

(72) Inventors: Jerome Mathieu, Troy, MI (US); Andre Dos-Santos-De-Sa, Creteil (FR)

(73) Assignee: Valeo Comfort and Driving Assistance (FR)

( * ) Notice: Subject to any disclaimer, the term of this patent is extended or adjusted under 35 U.S.C. 154(b) by 135 days.

(21) Appl. No.: 18/405,144

(22) Filed: Jan. 5, 2024

(65) Prior Publication Data
US 2025/0225797 A1 Jul. 10, 2025

(51) Int. Cl.
*G06V 20/59* (2022.01)

(52) U.S. Cl.
CPC ........ *G06V 20/597* (2022.01); *G06V 2201/07* (2022.01)

(58) Field of Classification Search
CPC .......................... G06V 20/597; G06V 2201/07
See application file for complete search history.

(56) References Cited

U.S. PATENT DOCUMENTS

| | | | |
|---|---|---|---|
| 10,507,844 B2 | 12/2019 | Biondo et al. | |
| 10,780,890 B2 * | 9/2020 | McGill | B60W 30/182 |
| 10,894,546 B2 | 1/2021 | Vanhelle et al. | |
| 2016/0229413 A1 * | 8/2016 | Morley | H04N 17/002 |
| 2020/0101982 A1 * | 4/2020 | Bowers | B60K 28/063 |
| 2022/0003747 A1 * | 1/2022 | Seo | B60K 28/063 |
| 2023/0044709 A1 * | 2/2023 | Jung | B60W 50/10 |
| 2024/0242515 A1 * | 7/2024 | Tanaka | G06V 20/597 |

FOREIGN PATENT DOCUMENTS

| | | | | |
|---|---|---|---|---|
| CN | 114611602 A * | 6/2022 | | G06F 18/24 |
| DE | 102021212388 A1 * | 5/2023 | | B60K 28/063 |
| EP | 3106872 A1 | 12/2016 | | |
| JP | 2008191871 A | 8/2021 | | |

OTHER PUBLICATIONS

International Search Report & Written Opinion for PCT/US2024/060166, Completed Apr. 5, 2025, Mailed May 8, 2025, 16 Pages.

* cited by examiner

*Primary Examiner* — Mohamed Barakat
(74) *Attorney, Agent, or Firm* — Dickinson Wright PLLC

(57) ABSTRACT

Methods and system for inhibiting a driver from cheating a vehicle breath alcohol sensor. The breath alcohol sensor is mounted within a vehicle and determines an alcohol concentration of a breath of an occupant. An image sensor generates images of the occupant within the vehicle. A processor is configured to determine whether the occupant is attempting to cheat the breath alcohol sensor by executing image processing on the images to identify a face of the occupant, objects in front of the face of the occupant, and/or whether the occupant is actually the one blowing into the breath alcohol sensor. If the image processing yields results that the driver is attempting to cheat the sensor, the processor can inhibit driver operation of the vehicle.

16 Claims, 6 Drawing Sheets

300

302

410

414

412

420

424

422

PREVENTING CHEATING OF IN-VEHICLE BREATH ALCOHOL ANALYZER SYSTEM

TECHNICAL FIELD

The present disclosure relates generally to a breath alcohol analyzer system in a motor vehicle, specifically with respect to reducing or eliminating the ability for a driver to cheat the breath alcohol analyzer system.

BACKGROUND

Impaired driving is a major safety issue of international interest and concern. For example, it is well known that alcohol impaired driving accounts for a significant proportion of annual traffic fatalities. To reduce alcohol impaired driving, it is known to use alcohol ignition breath sensors on vehicles, which require drivers to pass an alcohol screening test before starting the vehicle. These in-vehicle detection systems can sense alcohol concentration, and in turn limit or prevent operation of the vehicle if the driver is determined to be impaired.

However, there are several known ways that these in-vehicle breath alcohol analyzer systems can be cheated or tampered with. For example, an impaired driver may ask another passenger in the vehicle to breathe into the breath alcohol sensor. Other ways drivers have attempted to cheat the breath alcohol analyzer systems include: using non-intoxicated breath stored in a balloon to blow onto the breath alcohol sensor, using a charcoal filter to absorb intoxicating substances in the breath, opening windows to dilute the alcohol in the breath, and blowing through a tube or bottle that can interfere with the sensor.

SUMMARY

In an embodiment, a system for inhibiting a driver from cheating a vehicle breath alcohol sensor includes a breath alcohol sensor mounted within a vehicle and configured to determine an alcohol concentration of a breath of an occupant of the vehicle. The system includes an image sensor mounted within the vehicle and configured to generate images of the occupant within the vehicle. The system includes a processor communicatively coupled to the breath alcohol sensor and to the image sensor, the processor being configured to determine whether the occupant is attempting to cheat the breath alcohol sensor. To do so, the processor is programmed to: (a) compare the alcohol concentration of the breath to a threshold; (b) execute image processing on the images to identify (i) a face of the occupant and (ii) an object in front of the face of the occupant or in front of the breath alcohol sensor; and (c) determine that the occupant is attempting to cheat the breath alcohol sensor based on (i) the comparison of the alcohol concentration of the breath to the threshold and (ii) the execution of the image processing unable to identify the face of the occupant or identifying the object in front of the face of the occupant or in front of the breath alcohol sensor when the alcohol concentration of the breath is being compared to the threshold.

In another embodiment, a system for inhibiting a driver from cheating a vehicle breath alcohol sensor includes a breath alcohol sensor mounted within a vehicle and configured to determine an alcohol concentration of a breath of an occupant of the vehicle. The system includes an image sensor mounted within the vehicle and configured to generate images of the occupant within the vehicle. The system includes a processor communicatively coupled to the breath alcohol sensor and the image sensor, the processor being configured to determine whether the occupant is attempting to cheat the breath alcohol sensor. The processor is programmed to: compare the alcohol concentration of the breath to a threshold; execute image processing on the images to identify a face of the occupant and determine that the occupant is not blowing or breathing into the breath alcohol sensor; and determine that the occupant is attempting to cheat the breath alcohol sensor based on (i) the comparison of the alcohol concentration of the breath to the threshold and (ii) the execution of the image processing indicating that the occupant is not blowing or breathing into the breath alcohol sensor during the comparison of the alcohol concentration of the breath to the threshold.

In another embodiment, a computerized method for inhibiting a driver from cheating a vehicle breath alcohol sensor includes the following: receiving a signal from a breath alcohol sensor mounted within a vehicle, wherein the signal indicates an alcohol concentration of a breath of an occupant of the vehicle; comparing the alcohol concentration to a threshold; receiving image data from an image sensor mounted within the vehicle, wherein the image data is associated with a field of view corresponding to a cabin of the vehicle; identifying a face of an occupant in the vehicle via image processing on the image data; determining that an object is in front of the face of the occupant via image processing on the image data; and determining if the occupant is attempting to cheat the breath alcohol sensor based on the determination that an object is in front of the face of the occupant during the comparison of the alcohol concentration to a threshold.

DETAILED DESCRIPTION

Figure 1:
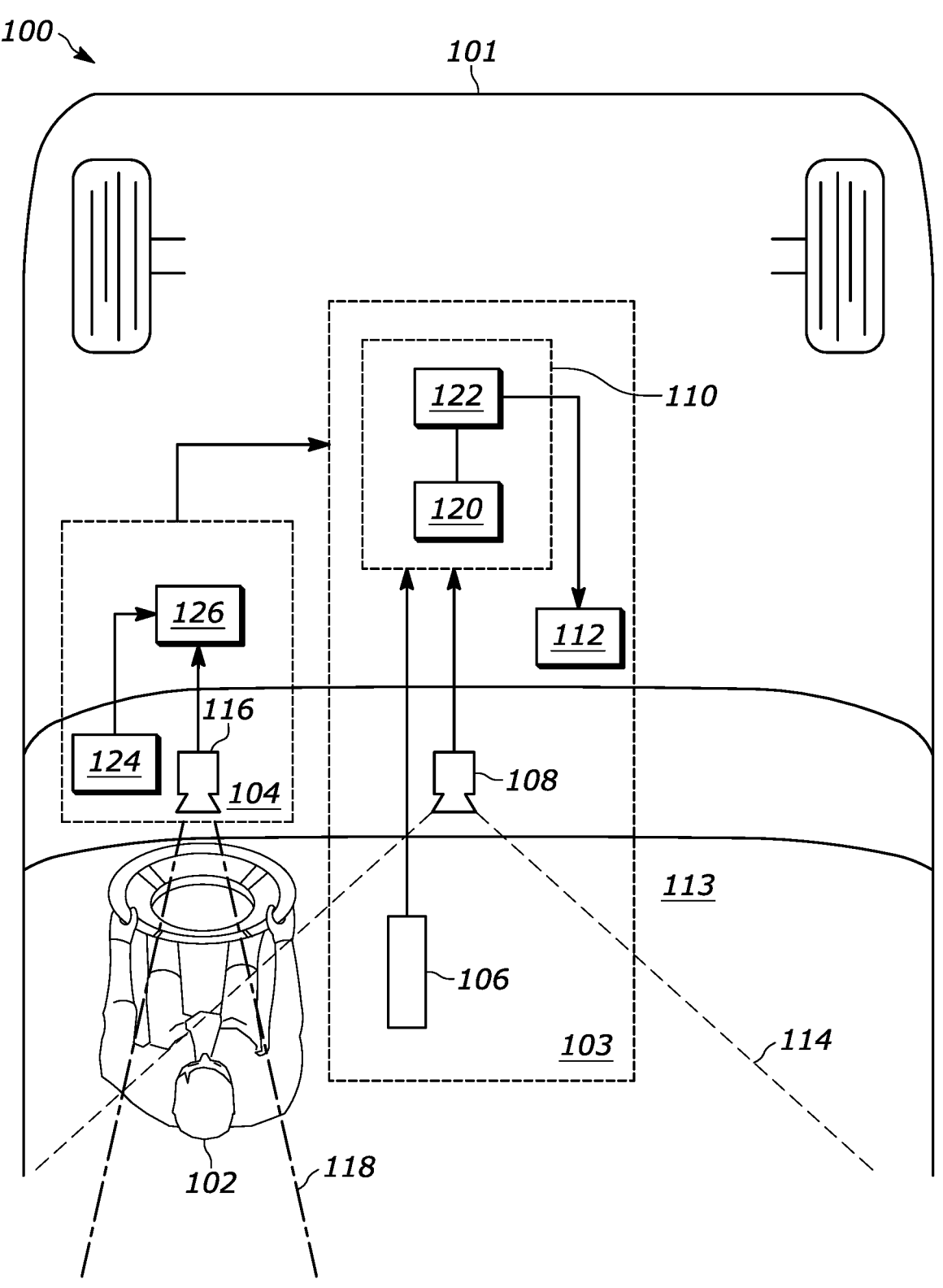
FIG. 1 is a schematic representation of an in-vehicle breath alcohol analyzer system with driver verification according to one embodiment of the present disclosure.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

"A", "an", and "the" as used herein refers to both singular and plural referents unless the context clearly dictates otherwise. By way of example, "a processor" programmed to perform various functions refers to one processor programmed to perform each and every function, or more than one processor collectively programmed to perform each of the various functions.

Several in-vehicle driver impairment detection systems are known. For example, a breathalyzer is one type of breath alcohol analyzer device that estimates a blood alcohol content (BAC) of an individual. When installed in a vehicle, the breathalyzer can cause a corresponding actuator to prevent or limit operation of the vehicle if the detected BAC is above a certain threshold (e.g. a legal limit, such as 0.05% BAC, 0.08% BAC or 0.10% BAC). This inhibits an intoxicated person from driving the vehicle. More passive breath alcohol analyzer devices can measure the alcohol level in a driver's naturally exhaled breath as the driver breathes normally.

However, these in-vehicle driver impairment detection systems are prone to tampering and cheating. For example, in order to cheat the system, an impaired (e.g., drunk) driver might do one of the following actions: ask a passenger to blow into the breath sensor, use non-intoxicated breath stored in a balloon to blow into the breath alcohol sensor, use a charcoal filter to absorb intoxicating substances in the breath, open windows to dilute alcohol in the driver's breath, or blow air through a tube or bottle in front of the sensor. Without the ability to determine if a driver is cheating the driver impairment detection system, an impaired driver might be able to operate the vehicle, putting the driver, passengers, and other drivers or pedestrians at risk.

Therefore, according to various embodiments described herein, methods and systems are provided for reducing or eliminating the ability for a driver to cheat an in-vehicle driver impairment detection systems. In some embodiments, a system for determining whether a driver is cheating a breath alcohol analyzer system can include a breath alcohol analyzer device (such as a sensor configured to detect an alcohol content in the breath of a driver), and an image sensor (e.g., camera) for capturing images of the driver's face and its surroundings. The system can use face detection and/or recognition to determine the presence of the driver's face, and process the image to determine if any items are in front of the driver's mouth or face, which would indicate that the driver may be attempting to cheat the breath alcohol analyzer system. The system can fuse the data from the breath alcohol analyzer device and the image sensor to determine if it is indeed the driver that is exhaling breath into the breath sensor. In other embodiments, the face detection and/or recognition can verify that the driver is the person breathing into the breath sensor.

Various object-detection machine-learning models and/or image processing systems can be utilized to determine the presence of an object near the driver's face that would interfere with the breath alcohol sensor. For example, the system can detect the presence of a mask, a cigarette, a snorkel, a pipe, a balloon, another passenger's head, and the like in the vicinity of the breath sensor. If such an object is detected, the system can cause the results of the breath alcohol analyzer system to be void, requiring a new breath test to be taken by the driver.

FIG. 1 is a schematic representation of a system 100 for inhibiting a driver from cheating a vehicle breath alcohol analyzer system in accordance with one example embodiment of the present disclosure. This can also be referred to as a driver impairment detection and verification system, in that the system detects impairment of the driver via a breath alcohol sensor, and verifies that it is actually the driver that is breathing into the sensor. The system 100 can also be referred to as a system for inhibiting a driver from cheating a vehicle breath alcohol analyzer. As seen, a vehicle 101 includes a driver 102, an impairment detection and verification system 103, and additional vehicle sensor system 104. The additional vehicle sensor system 104 may be part of the impairment detection and verification system 103. The vehicle 101 may be a passenger vehicle, a cargo vehicle (such as a semi-trailer truck or pickup truck), heavy machinery, or any other manually operated vehicle. The impairment detection and verification system 103 can include a breath alcohol sensor 106, an image sensor 108, an analysis module 110, and a vehicle enablement system 112. The additional vehicle sensor system 104 is optionally provided to augment the impairment detection and verification system 103, such as by improving accuracy and/or reliability of the system 103.

The breath alcohol sensor 106 and image sensor 108 are located within the vehicle cabin 113, while other aspects of the system 103 may be located elsewhere in the vehicle 101. In one embodiment, the breath alcohol sensor 106 is mounted adjacent the steering wheel or steering column, in a location where the driver's face can be detected by the image sensor 108 while the driver blows or breathes onto or into the breath alcohol sensor 106. In another embodiment, the breath alcohol sensor 106 is mounted adjacent a driver-side HVAC vent. In yet another embodiment, the breath alcohol sensor 106 is mounted at or on the A-pillar of the vehicle, adjacent the driver, or in an upper region of the driver-side door of the vehicle 101.

The breath alcohol sensor 106 can be part of a breath alcohol analyzer or detecting device configured to determine a breath alcohol concentration (BrAC) which is related to blood alcohol concentration (BAC). For example, the breath alcohol analyzer can be an A ONE device sold by SENSEAIR, or the breath test system disclosed in U.S. Pat. No. 9,823,237. In embodiments, the breath alcohol sensor 106 can include two detection paths: a first path for detecting carbon dioxide ($CO_2$) and a second path for detecting alcohol. This allows for the breath alcohol sensor 106 to simultaneously determine a breath dilution factor (indicating whether the air detected by the sensor has been diluted by something other than a typical human exhale) as well as the alcohol content in that breath. As opposed to breathalyzers which require a user to wrap their lips around a tube and blow hard into the tube which is connected to an alcohol sensor, the breath alcohol sensor 106 of the present impairment detection and verification system 103 can measure the alcohol level in the driver's naturally exhaled breath as the driver breathes normally into or near the sensor 106. As such, the breath alcohol sensor 106 may be a contactless sensor in that it does not require the driver to physically contact the sensor 106 or any tube or connecting structure. Since $CO_2$ is naturally part of exhaled breath, if the sensor 106 does not detect any $CO_2$ in the breath being analyzed, the test may be failed and it may be determined that the driver is attempting to cheat the breath alcohol sensor.

In embodiments, the breath alcohol sensor 106 generates an electrical signal representative of the property sensed, and outputs such signal to the analysis module 110 as discussed below. An analog-to-digital converter may be provided within the sensor 106 itself and used to convert the electrical signal into digital form. Alternatively, the analog-to-digital converter may be provided separately from the breath alcohol sensor 106, such as within the analysis module 110, for example.

The image sensor 108 is configured to sense or generate image data used for validating that the driver is the person who actually breathed into the breath alcohol sensor 106. In embodiments, the image sensor 108 can be a camera, for example a 3D time of flight (TOF) scannerless LIDAR (light detection and ranging) camera that uses high power optical pulses in durations of nanoseconds to capture depth information (typically over short distances) from a scene of interest. The camera can also be an infrared (IR) camera, or optical camera. No matter the type of image sensor 108, the image sensor 108 can be configured to, in conjunction with an associated processor, differentiate between a head of the driver and other objects in the scene (such as another person's head, a hand covering the head, another object covering the head, etc.).

In embodiments wherein the image sensor 108 is a 3D TOF camera, a 3D TOF camera operates by illuminating the scene of interest with a modulated light source, and observing light reflected from the scene. Phase shift between the illumination light and the reflection light is measured and translated to distance. Typically, the illumination light is provided by a solid-state laser or an LED operating in the near-infrared (NIR) spectrum which may or may not be invisible to the human eyes. Wavelengths of 850 nm or 940 nm may be used, for example. An imaging sensor designed to respond to the same spectrum receives the light and converts the photonic energy to electrical charges. The light entering the sensor has both the ambient light component and the reflected component.

In the embodiment of FIG. 1, the image sensor 108 may be a 3D TOF camera mounted in the center of the vehicle to detect the scene of the vehicle cabin 113, including the driver 102 and other occupants. The camera has a field of view (FoV) 114 that encompasses the head of the driver 102 while breathing or exhaling into the predetermined location of the breath alcohol sensor 106. The FoV 114 can also encompass the upper region of the passenger seat of the vehicle 101 so as to capture images of the head of the passenger, as well as objects entering this scene. The FoV 114 can also be positioned so as to capture any objects that would be in between the driver's head and the breath alcohol sensor 106. The image sensor 108 may also be located where image sensor 116 (described below) is located, e.g., directly in front of the driver so as to have a FoV 118.

A primary purpose of a 3D sensor is to acquire three dimensional data of the objects in the real world that are inside the sensor FoV. Therefore such a sensor provides a point cloud data that holds information of the position of the objects they are representing, i.e. x, y and z values in real world coordinates. A variant of 3D sensors, known as 2D+depth (or 2D+Z) sensors, have only the depth or distance of a pixel available in real world coordinates, whereas the x and y coordinates are given in coordinates of the image plane. Although these are not necessarily true 3D sensors, software may be able to calculate the missing information based on other sensor parameters but at the cost of additional processing time. Thus, the image sensor 108 may be implemented as a 2D+depth image sensor.

Images acquired by the image sensor 108 can be transmitted in the form of a data stream (e.g., image data) to the analysis module 110. The analysis module 110 includes a processor 120, such as a microprocessor, and a memory storage 122, such as a rewritable nonvolatile memory. The analysis module 110 receives signals generated by the breath alcohol sensor 106 and image sensor 108, and in turn processes these signals to determine impairment and to verify the source of the breath is the driver.

The analysis module 110 may more generally be referred to as a controller, and can be any controller capable of receiving information from the breath alcohol sensor, image sensor 108, and/or sensor system 104, processing the information, and output instructions to the vehicle enabling system 112, for example. The processor hardware in the analysis module 110 (e.g., processor 120) may include shared, dedicated, or group processor hardware that executes code, and the memory hardware in the analysis module 110 (e.g., memory 122) may include shared, dedicated, or group memory that stores code executed by the processor hardware. The code is configured to provide the features of the controller and systems described herein. The processor may include one or more devices selected from microprocessors, micro-controllers, digital signal processors, microcomputers, central processing units, field programmable gate arrays, programmable logic devices, state machines, logic circuits, analog circuits, digital circuits, or any other devices that manipulate signals (analog or digital) based on computer-executable instructions residing in memory. The memory may include a single memory device or a plurality of memory devices including, but not limited to, random access memory ("RAM"), volatile memory, non-volatile memory, static random-access memory ("SRAM"), dynamic random-access memory ("DRAM"), flash memory, cache memory, or any other device capable of storing information. The non-volatile storage may include one or more persistent data storage devices such as a hard drive, optical drive, tape drive, non-volatile solid-state device, or any other device capable of persistently storing information. The processor may be configured to read into memory and execute computer-executable instructions embodying one or more software programs residing in the non-volatile storage. Programs residing in the non-volatile storage may include or be part of an operating system or an application, and may be compiled or interpreted from computer programs created using a variety of programming languages and/or technologies, including, without limitation, and either alone or in combination, Java, C, C++, C#, Objective C, Fortran, Pascal, Java Script, Python, Perl, and PL/SQL. The computer-executable instructions of the programs may be configured, upon execution by the processor, to cause disabling of the vehicle controls, for example.

Implementations of the subject matter and the operations described in this specification can be implemented in digital electronic circuitry, or in computer software embodied on a tangible medium, firmware, or hardware, including the structures disclosed in this specification and their structural equivalents, or in combinations of one or more of them. Implementations of the subject matter described in this specification can be implemented as one or more computer programs embodied on a tangible medium, e.g., one or more modules of computer program instructions, encoded on one or more computer storage media for execution by, or to control the operation of, a data processing apparatus. A computer storage medium can be, or be included in, a computer-readable storage device, a computer-readable storage substrate, a random or serial access memory array or device, or a combination of one or more of them. The computer storage medium can also be, or be included in, one or more separate components or media (e.g., multiple CDs, disks, or other storage devices). The computer storage medium may be tangible and non-transitory.

A computer program (also known as a program, software, software application, script, or code) can be written in any form of programming language, including compiled languages, interpreted languages, declarative languages, and procedural languages, and the computer program can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, libraries, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., a field programmable gate array ("FPGA") or an application specific integrated circuit ("ASIC"). Such a special purpose circuit may be referred to as a computer processor even if it is not a general-purpose processor.

In embodiments, based on a result of this processing, the analysis module 110 provides a control signal to the vehicle enabling system 112 to enable operation (or prevent operation) of the vehicle 101. The vehicle enabling system 112 may be or include an interlock that prevents starting of the vehicle, prevents starting of the engine, prevents operation of the gear shifter (e.g., preventing shifting the vehicle into DRIVE or REVERSE gear), or any other mechanism for enabling/disabling/inhibiting driving operation of the vehicle 101. Specifics of the vehicle enabling system 112 may be chosen by the vehicle original equipment manufacturer (OEM). Either the analysis module 110 and/or the vehicle enabling system 112 can include or be referred to as a controller, in that they can individually or collectively activate a controller that inhibits or prevents operation of the vehicle in the event the system 100 determines the driver is cheating the vehicle breath alcohol analyzer.

Additional sensor system 104 may be included to provide greater accuracy and/or reliability of the breath alcohol sensor 106 and the image sensor 108. For example, the additional sensor system 104 may include various physical sensors 124 such as seat sensors, seat belt sensors, or contact sensors throughout the cabin 113, and/or additional image sensors 116 to improve the accuracy, reliability or other characteristics of the system 100. The sensors can be controlled by an associated controller 126. In an example, a seat belt sensor can output a signal indicating that the driver's seat belt is buckled, and a seat sensor can output a signal indicating the driver's seat is being subjected to a certain weight (e.g., 50 pounds or greater). The additional sensor system 104 may also include a window sensor configured to detect if the window is open (which might interfere with accuracy of the breath alcohol sensor) or an HVAC sensor configured to detect if the vehicle HVAC system is on or operating (which might also interfere with accuracy of the breath alcohol sensor). These sensors can help verify that the source of the breath is the driver. In embodiments, a positive reading from these sensors is mandatory for the impairment detection and verification system 103 to output a positive result, e.g., enable operation of the vehicle. For example, it may be required that the seat belt is buckled, the windows are closed, and a weight exceeding a threshold is placed on the driver's seat in order for the system to verify the driver and allow operation of the vehicle. Further, sensors 124 may include additional breath alcohol sensors at different locations in the cabin 113 to measure the same or additional properties of the occupant to improve confidence in the detection and verification determinations of the system 103.

As another example, the image sensor 116 may be placed facing the driver's face, as represented by field of view (FoV) 118. The image sensor 116 may be a video camera, or another 3D TOF camera, or the like. The image sensor 116 can be provided separately from the image sensor 108, designed and placed so that the driver's face is completely included in the FoV 118. In certain embodiments, it may be advantageous to use a "multimodal" image sensor 116, i.e. sensitive both to radiation in the visible range and, for example, to radiation in the infrared range. In embodiments, the system 103 is able to perform facial recognition of the driver's face within the acquired images. The information provided by additional images taken in the infrared range facilitates this facial recognition since the driver's body (notably at the level of their face) has a higher temperature than its surroundings, and therefore stands out in an image taken in the infrared range. Further, images acquired in the infrared range permit facial recognition even at night or in contexts in which the light is too low for the images acquired in the visible range to be usable. In other embodiments, rather than providing a separate image sensor 116, facial recognition is provided as an additional capability of the image sensor 108. For example, the image sensor 108 may be a driver monitoring system (DMS) including a near IR camera that uses pulsed LED information such as the 3D TOF camera discussed above, with a resolution sufficient to determine facial features. All functions and abilities performed by image sensor 108 may also be performed by image sensor 116, and vice versa.

The system 103 may rely on hardware and software that is part of a Driver Monitoring System (DMS). A DMS can be a camera-based system that tracks driver alertness. The system not only recognizes the driver, it also checks the driver's level of vigilance in order to increase safety for passengers and other road users. The DMS alerts the driver when it detects signs of drowsiness or distraction. These alerts can include haptic feedback on the steering wheel or pedals, noise alerts, head-up display alerts, and the like. Other system applications include driver identification and select certain functions in the drive interface using the eyes. These features contribute to increased safety and more intuitive use of the new generation of driver assistance functions. The cameras and associated processors can be configured to identify the driver so the vehicle can automatically restore their preferences and settings, monitor driver fatigue and alert them when it detects drowsiness, monitor driver attentiveness and ensure they keep their eyes on the road, and the like. The system can rely on eye gaze determination, eyelid opening sensing, and the like.

Radar can also be utilized to determine the respiration status and rate of the driver. As such, one or more of the image sensors 108, 116 can be or include a radar sensor, or an additional radar sensor can be provided. The radar sensor may be configured to emit and receive reflected radio signals. For example, the radar sensor may be a millimeter wave or an ultra-wideband (UWB) device that emits a millimeter wave or UWB signal, and receives the reflected millimeter wave or UWB signals once they have reflected off the objects. This reflection data corresponding to the millimeter wave signal or UWB signal can be utilized to generate an image of the scene within the vehicle. Due to the capabilities and accuracies of radar (e.g., UWB) devices, the radar device can also be used to determine a respiration rate of the driver, based upon the reflected signals indicating that the chest area of the driver is moving closer or further away from the sensor (indicating that the user is inhaling or exhaling, respectively). Using the radar sensor, if the detected respiration status and/or rate of the driver matches the breath sensed by the sensor, the system can confirm that the driver is the one exhaling into the sensor. If the respiration status and/or rate of the driver does not match the breath sensed by the sensor, the system can determine or infer that another source of breath is being provided to the sensor, such as a balloon filled with un-intoxicated breath or another driver/occupant. Image processing techniques described above can then be used to confirm this determination.

Figure 2A:
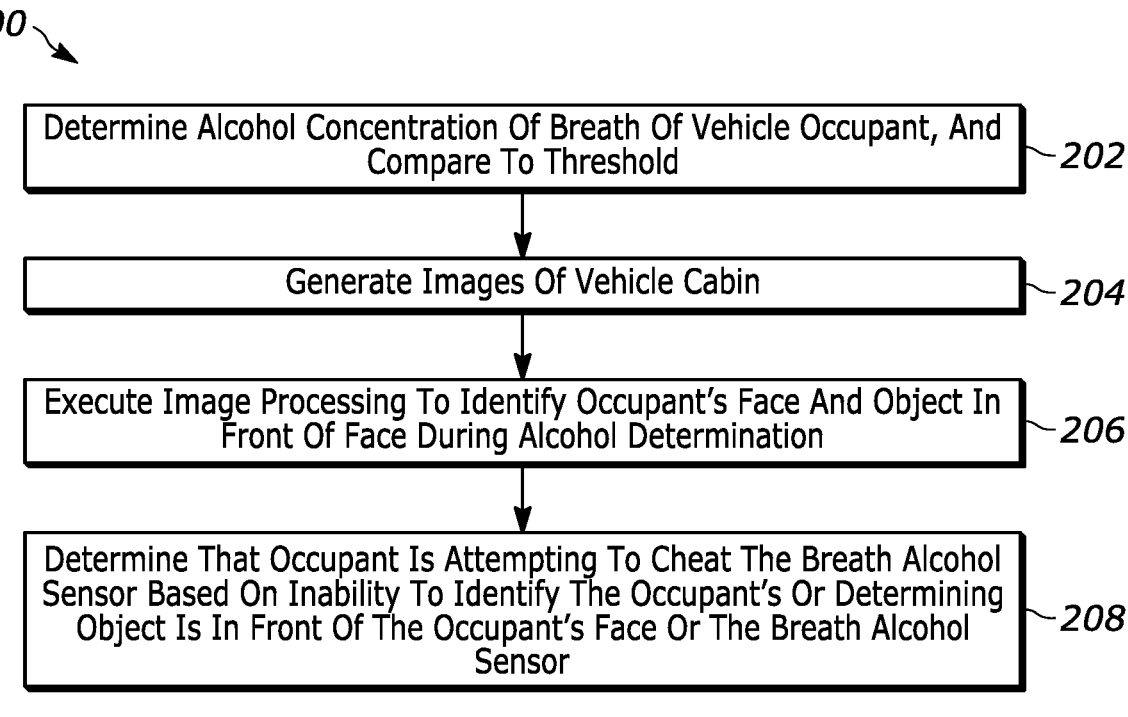
FIGS. 2A-2B are a process flow diagrams illustrating execution of an in-vehicle breath alcohol analyzer system according to embodiments of this disclosure.

FIG. 2A illustrates a process flow diagram indicating an impairment detection and driver verification process that may be performed by an in-vehicle detection and verification system according to embodiments of this disclosure. The method 200 may be performed using the analysis module 110, i.e. the processor 120 and memory 122.

At 202, a breath alcohol sensor (e.g., alcohol sensor 106) determines the concentration of breath of a vehicle occupant. Simultaneously, the breath alcohol sensor 106 can have an associated processor (e.g., one of those described herein) that compares the determined concentration to a threshold, such as an alcohol legal driving limit threshold. This threshold can vary by jurisdiction, and can be pre-programmed or determined according to the provider of the sensor 106.

In an embodiment, the breath alcohol sensor 106 is activated upon the operator attempting to start the car. For example, when the operator turns an ignition key or presses the ON button in the vehicle cabin, the breath alcohol sensor 106 can activate and begin detecting a breath alcohol concentration prior to the vehicle enabling a driving operation. The breath alcohol sensor 106 can be in communication with a vehicle display that instructs the operator to breath into the breath alcohol sensor when appropriate. As explained above, if the alcohol concentration is determined to be above the set threshold, vehicle operation may be inhibited.

Figure 3:
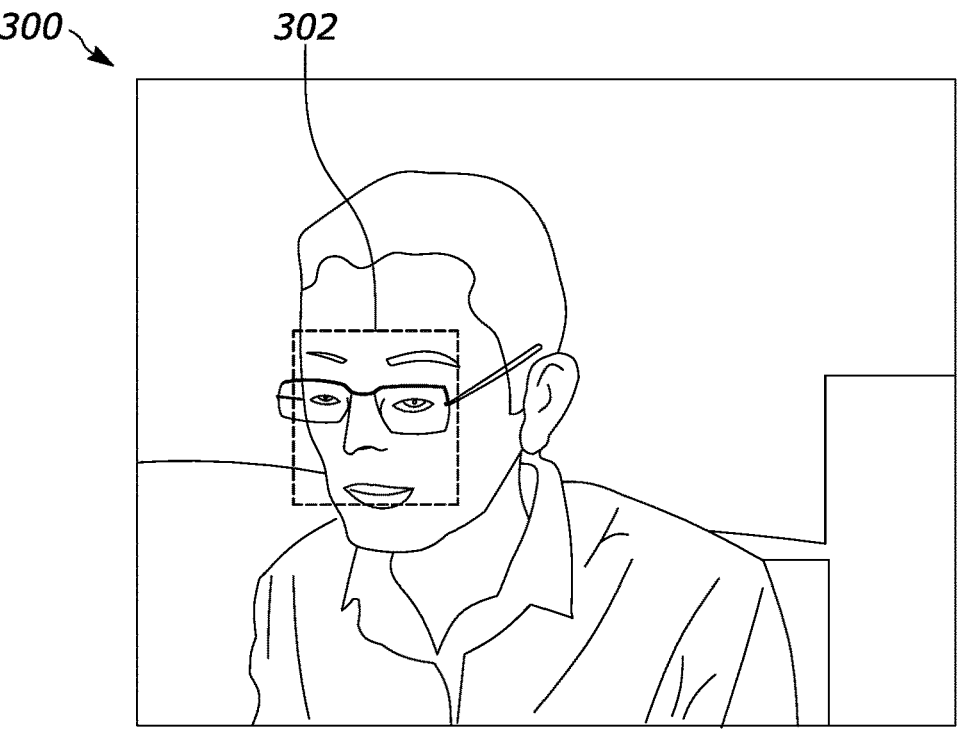
FIG. 3 is an example of an image generated from an image sensor mounted within the vehicle, in an embodiment.

At 204, an image sensor (e.g., image sensor 108 and/or 116) generates images of the vehicle cabin. An example of this is shown in FIG. 3, wherein an image 300 is generated from the image sensor 108/116. This step may also be performed simultaneously with the activation of the breath alcohol sensor and during alcohol concentration determination. The image sensor can be positioned such that it captures images and generates associated image data associated with the vehicle cabin, such as a location where a driver would sit in a driver seat.

At 206, one or more processor described herein executes image processing on the images generated from the image sensor. The image processing may include one or more object-recognition machine-learning models configured to identify a face of an occupant. As an example, the image processing may utilize Haar Cascade Classifiers which uses Haar features to detect faces, Histogram of Oriented Gradients (HOG) which analyzes the distribution of gradients in an image to identify objects or shapes (e.g., faces), Convolutional Neural Networks (CNNs) or other deep learning models such as R-CNN, Fast R-CNN, and YOLO (You Only Look Once) which use convolutional layers to detect faces by learning patterns and features from large datasets. In other embodiments, the image processing relies on Open Source Computer Vision Library (OpenCV) which includes pre-trained models and libraries for face detection, including methods like Haar cascades, deep neural networks (DNNs), etc.

The image processing can identify a face of an occupant, and use bounding boxes around the identified face. For example, returning to FIG. 3, the image processing can yield bounding box 302 at or around the detected face. The bounding box can change location and size depending on the location and size of the occupant's face in the image 300. The bounding box can serve to outline or encapsulate the detected facial region, and visually represents the area where the algorithm has identified a face. The bounding box also allows for further analysis or processing of the detected face by isolating this region for feature extraction such as detecting the location, position, and orientation of the person's mouth. Also, if more than one person is detected in the image, multiple bounding boxes can be used.

Memory (such as memory 122) may include instructions that, when executed by the processor 120, cause the processor to perform the object recognition and identify the presence of a face in the images using one of the above referenced models as an example. Alternatively, the vehicle can communicate wirelessly (as will be described with reference to FIG. 5) via a network to a remote server that contains the necessary processing abilities for the object recognitions described herein.

Also during this time, the object recognition can be programmed to detect an object in front of the occupant's face. This object recognition can be performed simultaneously with the facial identification and recognition described above, and can be executed with one or more of the above-described image processing techniques. As described above, vehicle occupants may attempt to cheat the alcohol test system by using items such as a tube, balloon full of clean air, or other measures to direct clean, non-alcoholic air at the breath alcohol sensor. The image processing can be configured to detect such objects in the image, particularly in a location in front of the occupant's face or mouth.

Figure 4A:
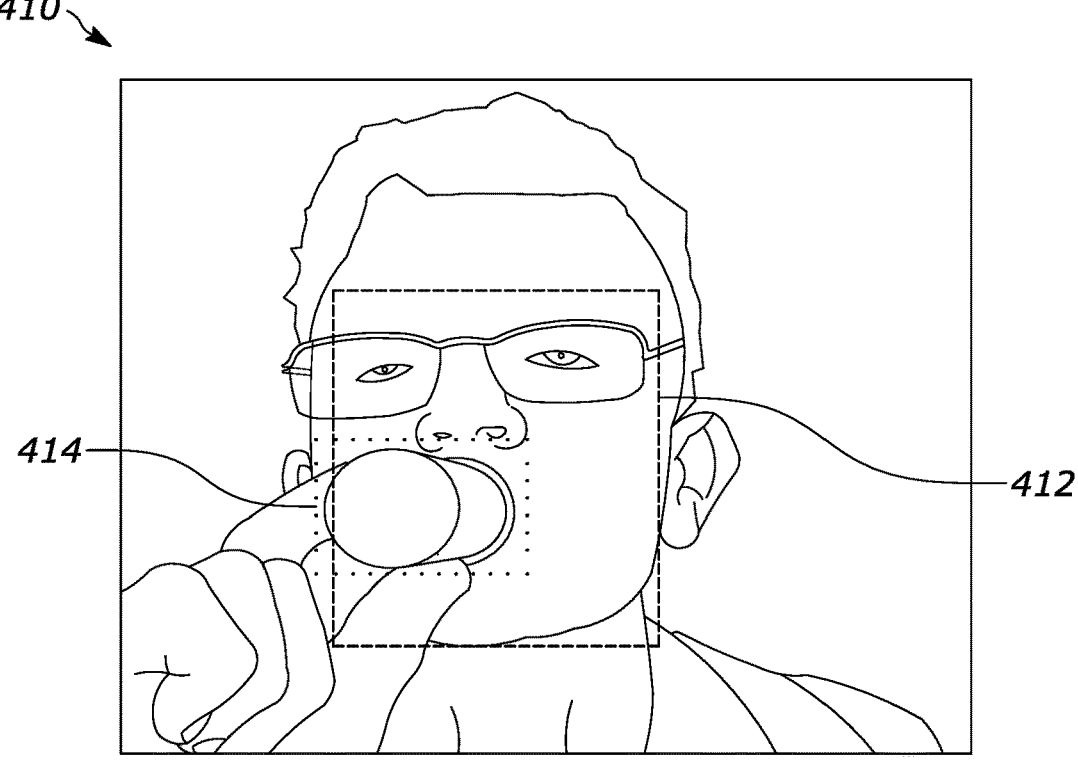
FIGS. 4A-4B are more examples of images generated from the image sensor, with bounding boxes shown surrounding the occupant's face, and bonding boxes identifying objects that are in front of the occupant's face that may interfere with the breath alcohol sensor, according to an embodiment.
Figure 4B:
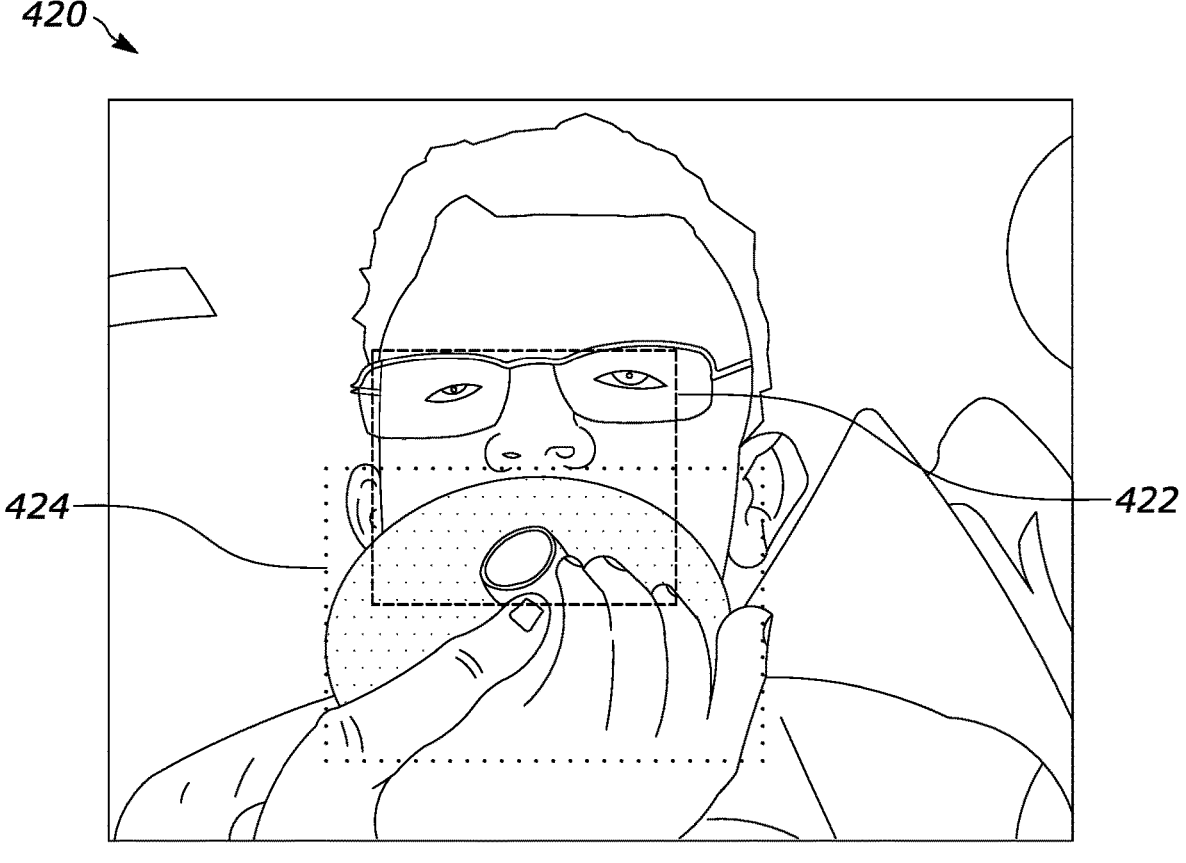

Some object detection models (e.g., YOLO, shingle shot multibox detector (SSD)) are capable of detecting multiple object classes simultaneously, and thus could be suited for the detection of both the occupant's face and another object. Bounding boxes can also be placed over those objects as well. Examples of this are shown in FIGS. 4A-4B. FIG. 4A shows an image 410 with a first bounding box 412 encompassing a detected face, and a second bounding box 414 encompassing a detected object, in this case a tube (which may have a filter inside, for example). FIG. 4B shows another image 420 with a first bounding box 422 encompassing a detected face, and a second bounding box 424 encompassing a detected object, in this case a balloon and/or a hand. In scenarios where objects are close to a detected face, a hierarchical approach can be used. The system might first identify and draw a bounding box around the face, then perform a secondary object detection to identify and label objects near the face, as shown in FIGS. 4A-4B.

In some embodiments, facial recognition may be employed where not only a face is identified, but the identification of the actual person is made by comparing the detected features of the face against a database of known faces. Initially, the system can identify and detect the presence of a face, no matter who's face it is, pursuant to the above strategy (e.g., CNNs, HOG, etc.). Once a face is detected, specific features are extracted from it. These features might include the distance between eyes, nose shape, mouth structure, etc. These features are turned into a mathematical representation or embedding that captures the unique characteristics of the face. The extracted facial features are then transformed into a compact numerical representation, (referred to as a face template or face embedding). This numerical representation encodes the essential information about the face while reducing the dimensionality of the data. The obtained face template is compared against a database of stored face templates or enrolled faces. This database contains templates of known individuals, such as an authorized driver of the vehicle.

This disclosure is not meant to be limiting on the precise manner in which a face can be detected and the person identified. Various systems can be employed to do this, such as traditional methods like eigenfaces or Fisherfaces, or more advanced techniques using deep neural networks (e.g., FaceNet, VGGFace, ArcFace, etc.).

At 208, one or more processors described herein can be programmed to determine based on at least two items while the alcohol concentration of the breath is being compared to the threshold. These two items are: (i) the actual comparison of the alcohol concentration of the breath to the threshold (e.g., whether there is detected alcohol presence in the breath) and (ii) the image processing being either unable to identify the face of the occupant or the image processing identifying an object in front of the face of the occupant or in front of the breath alcohol sensor. Being unable to determine a presence of the operators face in the field of view can be a strong indicator that the operator is attempting to cheat the breath alcohol sensor, for example by hiding his/her face from view by another object and allowing that object to interfere with the breath coming from the operator. Rather than failing to identify the operator's face, it can also be determined that the operator is attempting to cheat the breath alcohol sensor based on an affirmative identification of an object in front of the operator's face.

Additionally, one or more processor described herein can be programmed to inhibit vehicle operation based on the determination that an object is indeed in front of the occupant's face while the alcohol test is in process. The vehicle enabling system 112 can be utilized, in which an enablement of operation of the vehicle is only allowed if and when the alcohol concentration is determined to be below the threshold and there are no other objects detected in the image that would interfere with the person blowing into the alcohol sensor. An interlock or other mechanism may be used to inhibit vehicle operation, as explained above.

Figure 2B:
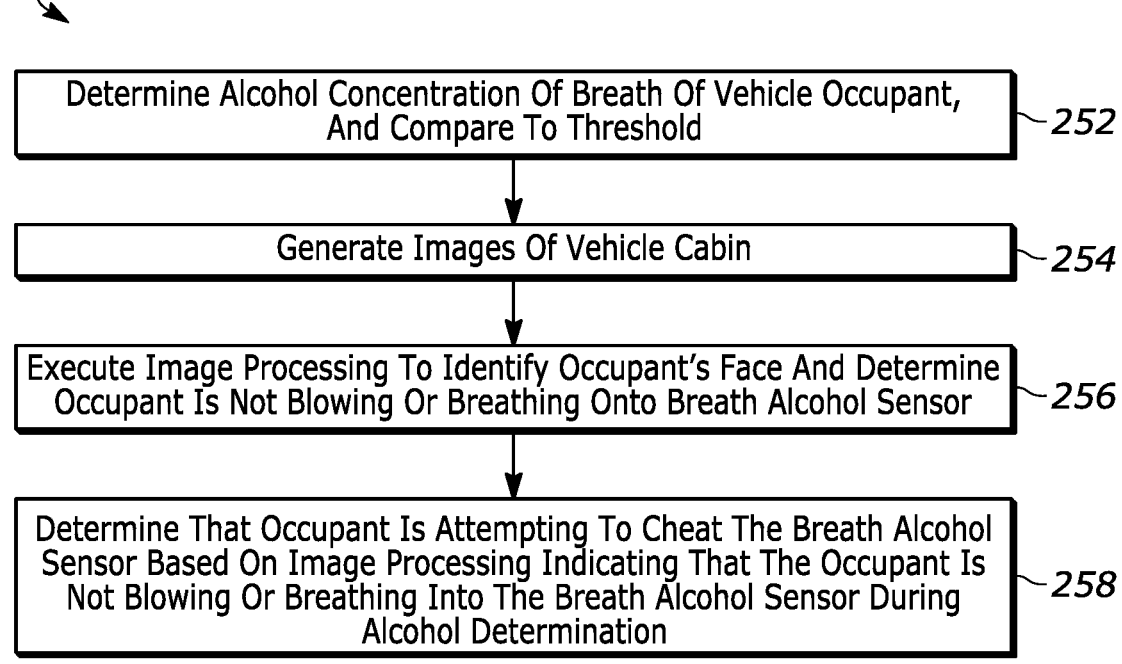

FIG. 2B illustrates another process flow diagram indicating an impairment detection and driver verification process that may be performed by an in-vehicle detection and verification system according to another embodiment. The method 250 may be performed using the analysis module 110, i.e. the processor 120 and memory 122.

The method includes first performing an alcohol concentration test at 252 and generating images of the cabin at 254.

These steps are similar to steps 202 and 204 in FIG. 2A and therefore in the interest of brevity are not explained again.

At 256, the processor executes image processing to identify an occupant's face, as was the case in step 206. However, instead of (or in addition to) performing image processing to detect the presence of another object in front of or near the occupant's face, here at 256 the image processing determines whether the occupant is blowing or breathing into the breath sensor. This may involve feature extraction, for example. Feature extraction in the context of identifying facial expressions or mouth movements involves analyzing specific facial regions (e.g., the mouth) to understand the actions (e.g., blowing or breathing) being portrayed. In one embodiment, facial landmark detection is used which involves identifying key points on the face, including the corners of the mouth, lips, and surrounding regions. Techniques like the use of facial landmark detection algorithms (e.g., using the dlib library or methods based on convolutional neural networks) can locate these points. In addition, mouth region analysis can be used in which once the facial landmarks are identified, analyzing changes in the mouth region, such as changes in lip curvature, openness, or movements offers insight as to whether the mouth is blowing or is at least open. The image processing can track the shape, movement, and deformation of the mouth area frame by frame. Additionally, machine learning models can be to recognize specific mouth movements or actions. By providing annotated data indicating different mouth actions (e.g., blowing, or non-blowing activities like speaking, or mouth being closed), algorithms can learn patterns and features associated with these actions. These machine learning models can be employed to determine whether the occupant is indeed blowing or not during the breath alcohol test, i.e., when the breath alcohol sensor is being utilized to detect alcohol concentration in the occupant's breath.

At 258, the processor determines that the occupant is attempting to cheat the breath alcohol sensor based on (i) the comparison of the alcohol concentration of the breath to the threshold and (ii) the execution of the image processing indicating that the occupant is not blowing or breathing into the breath alcohol sensor during the comparison of the alcohol concentration of the breath to the threshold.

In some embodiments, the processor can output a signal to inhibit vehicle operation based on the determination that the occupant is not blowing or breathing into the breath alcohol sensor during the alcohol concentration determination. Once again, the types of vehicle-inhibiting actions can vary, examples of which are described above.

Figure 5:
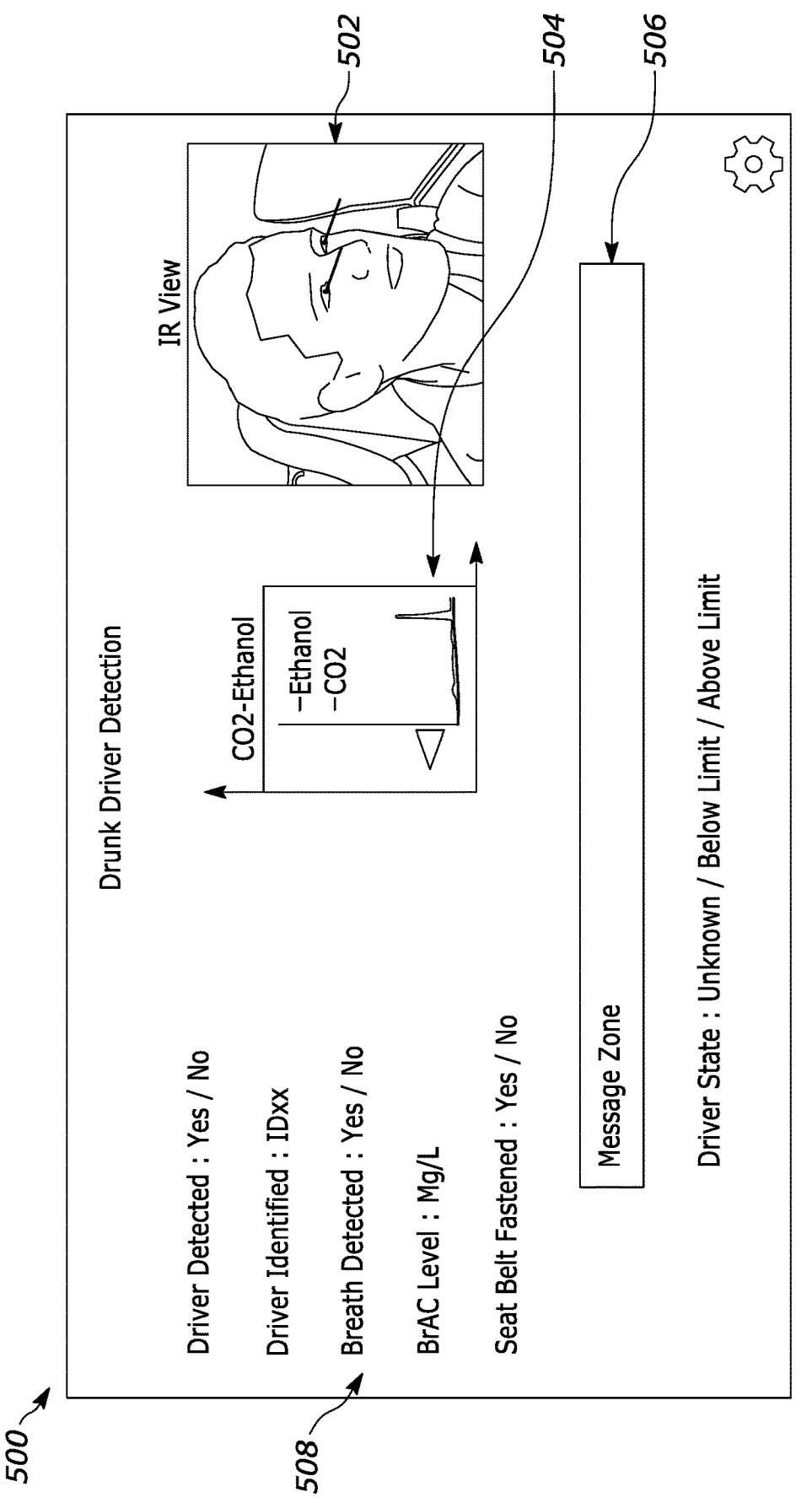
FIG. 5 is an example of a graphical user interface displayed within the vehicle during usage of the breath alcohol sensor, according to an embodiment.

FIG. 5 illustrates an example of a graphical user interface (GUI) 500 that may be displayed during use of the breath alcohol detection described herein. The GUI 500 may be displayed on a vehicle display, such as a digital screen within the vehicle cabin (e.g. instrument cluster display, center information display, etc.). The vehicle display can also be another device (e.g., smart phone) connected to the vehicle.

In embodiments, the GUI 400 includes a video stream 502 of the occupant's face. The video stream is generated from the image sensor 108/116. The GUI also includes the current results from the breath alcohol sensor, for example showing the content of carbon dioxide and alcohol in the breath over time, shown generally at 504. The GUI can also include a message zone at 506, where text information can be provided to the operator. For example, instructions may be provided here to inform the operator to begin breathing on the sensor when appropriate, for example. If an object is detected in the image, the message zone can also instruct the operator to remove the object from view. The message zone can also provide the operator with the results of the breath alcohol test, such as whether the driver is below the legal limit or above the legal limit of alcohol concentration. Other information (shown generally at 508) can be provided to the driver, such as whether or not the driver is detected in the image, breath is currently detected, the current breath alcohol concentration, and whether or not the driver seat belt is fastened (which again may cause the vehicle operation to be inhibited). Also, if facial recognition is performed by the image processing, the driver can be identified, and the identification of the driver can be displayed.

Figure 6:
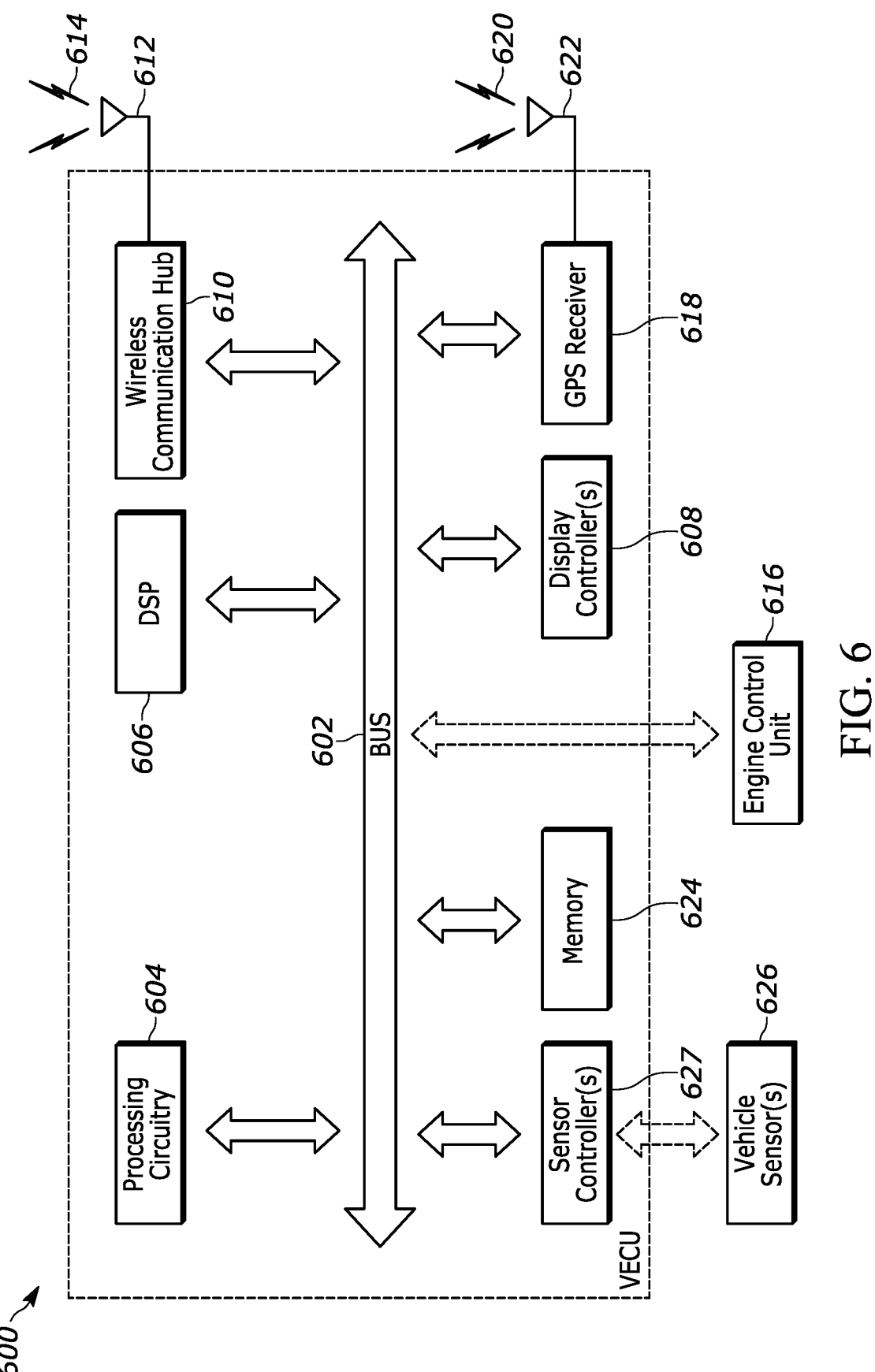
FIG. 6 illustrates a block diagram of a vehicle electronics control system, according to an exemplary embodiment of the present disclosure.

FIG. 6 is a block diagram of internal components of an exemplary embodiment of a computing system 600. The computing system 600 may include or be used to implement the computing systems described above. In this embodiment, the computing system 600 may be embodied at least in part in a vehicle electronics control unit (VECU). It should be noted that FIG. 6 is meant only to provide a generalized illustration of various components, any or all of which may be utilized as appropriate. It can be noted that, in some instances, components illustrated by FIG. 6 can be localized to a single physical device and/or distributed among various networked devices, which may be disposed at different physical locations.

The computing system 600 has hardware elements that can be electrically coupled via a BUS 602. The hardware elements may include processing circuitry 604 which can include, without limitation, one or more processors, one or more special-purpose processors (such as digital signal processing (DSP) chips, graphics acceleration processors, application specific integrated circuits (ASICs), and/or the like), and/or other processing structure or means. The above-described processors can be specially-programmed to perform the operations disclosed herein, including, among others, image processing, data processing, and implementation of the machine learning models described above. Some embodiments may have a separate DSP 606, depending on desired functionality. The computing system 600 can also include one or more display controllers 608, which can control the display devices disclosed above, such as an in-vehicle touch screen, screen of a mobile device, and/or the like.

The computing system 600 may also include a wireless communication hub 610, or connectivity hub, which can include a modem, a network card, an infrared communication device, a wireless communication device, and/or a chipset (such as a Bluetooth device, an IEEE 802.11 device, an IEEE 802.16.4 device, a WiFi device, a WiMax device, cellular communication facilities including 4G, 5G, etc.), and/or the like. The wireless communication hub 610 can permit data to be exchanged with a network, wireless access points, other computing systems, etc. The communication can be carried out via one or more wireless communication antenna 612 that send and/or receive wireless signals 614.

The computing system 600 can also include or be configured to communicate with an engine control unit 616, or other type of controller 108 described herein. In the case of a vehicle that does not include an internal combustion engine, the engine control unit may instead be a battery control unit or electric drive control unit configured to command propulsion of the vehicle. In response to instructions received via the wireless communications hub 610 indicating a successful pass of the breath alcohol test, the engine control unit 616 can be enabled to start the engine.

The computing system 600 also includes vehicle sensors 626 such as those described above with reference to FIG. 1.

These sensors can include, without limitation, one or more camera(s), radar(s), LiDAR(s), breath alcohol sensor(s), and the like. These sensors can be controlled via associated sensor controller(s) 627.

The computing system 600 may also include a GPS receiver 618 capable of receiving signals 620 from one or more GPS satellites using a GPS antenna 622. The GPS receiver 618 can extract a position of the device, using conventional techniques, from satellites of an GPS system, such as a global navigation satellite system (GNSS) (e.g., Global Positioning System (GPS)), Galileo, GLONASS, Compass, Galileo, Beidou and/or other regional systems and/or the like. GPS may be relied upon to track the vehicle movement in the event the driver has cheated the breath alcohol system, for example, or for exchanging information between the vehicle and a remote server.

The computing system 600 can also include or be in communication with a memory 624. The memory 624 can include, without limitation, local and/or network accessible storage, a disk drive, a drive array, an optical storage device, a solid-state storage device, such as a RAM which can be programmable, flash-updateable and/or the like. Such storage devices may be configured to implement any appropriate data stores, including without limitation, various file systems, database structures, and/or the like. The memory 624 can also include software elements (not shown), including an operating system, device drivers, executable libraries, and/or other code embedded in a computer-readable medium, such as one or more application programs, which may comprise computer programs provided by various embodiments, and/or may be designed to implement methods, and/or configure systems, provided by other embodiments, as described herein. In an aspect, then, such code and/or instructions can be used to configure and/or adapt a general purpose computer (or other device) to perform one or more operations in accordance with the described methods, thereby resulting in a special-purpose computer.

The processes and logic flows described in this specification can be performed by one or more programmable processors executing one or more computer programs to perform actions by operating on input data and generating output. The processes and logic flows can also be performed by, and apparatuses can also be implemented as, special purpose logic circuitry, e.g., an FPGA (field programmable gate array) or an ASIC (application specific integrated circuit). Devices suitable for storing computer program instructions and data can include non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. These memory devices may be non-transitory computer-readable storage mediums for storing computer-executable instructions which, when executed by one or more processors described herein, can cause the one or more processors to perform the techniques described herein. The processor and the memory can be supplemented by, or incorporated in, special purpose logic circuitry.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A system for inhibiting a driver from cheating a vehicle breath alcohol sensor, the system comprising:
   a breath alcohol sensor mounted within a vehicle and configured to determine an alcohol concentration of a breath of an occupant of the vehicle;
   an image sensor mounted within the vehicle and configured to generate images of the occupant within the vehicle; and
   a processor communicatively coupled to the breath alcohol sensor and to the image sensor, the processor being configured to determine whether the occupant is attempting to cheat the breath alcohol sensor, wherein the processor is programmed to:
      compare the alcohol concentration of the breath to a threshold,
      execute image processing on the images to identify (i) a face of the occupant and (ii) an object in front of the face of the occupant or in front of the breath alcohol sensor,
      execute image processing to determine, based on image processing on the images, that the occupant is not blowing or breathing into the breath alcohol sensor; and
      determine that the occupant is attempting to cheat the breath alcohol sensor based on (i) the comparison of the alcohol concentration of the breath to the threshold and (ii) the execution of the image processing unable to identify the face of the occupant or identifying the object in front of the face of the occupant or in front of the breath alcohol sensor indicating that the occupant is not blowing or breathing into the breath alcohol sensor when the alcohol concentration of the breath is being compared to the threshold;
      determine, based on image processing on the images, an image-based respiration rate of the occupant over time;
      wherein the determination that the occupant is not blowing or breathing into the breath alcohol sensor is based upon the image-based respiration rate of the occupant.

2. The system of claim 1, wherein the processor is further programmed to execute an object-recognition machine-learning model to determine the object is one of a balloon, tube, air filter, bottle, or a head of another occupant in the vehicle; and
   wherein the determining if the occupant is attempting to cheat the breath alcohol sensor is based upon the determination made by the object-recognition machine-learning model.

3. The system of claim 1, wherein the processor is further programmed to:
   determine, based on image processing of the images, a presence of another face of another occupant in a field of view of the image sensor; and
   wherein the determining if the occupant is attempting to cheat the breath alcohol sensor is based on the determination of the presence of another face in the field of view.

4. The system of claim 1, wherein the determination that the occupant is not blowing or breathing into the breath alcohol sensor is based on an orientation of the face of the occupant or a shape of a mouth of the occupant.

5. The system of claim 1, further comprising a radar device configured to emit and receive reflected millimeter waves or ultra wideband (UWB) waves,
   wherein the processor is further programmed to:
      determine, based on processing of the reflected waves, a radar-based respiration rate of the occupant,
      compare the radar-based respiration rate of the occupant with the image-based respiration rate, and
      wherein the determining if the occupant is attempting to cheat the breath alcohol sensor is based on the comparison indicating the radar-based respiration rate does not align with the image-based respiration rate.

6. A system for inhibiting a driver from cheating a vehicle breath alcohol sensor, the system comprising:
   a breath alcohol sensor mounted within a vehicle and configured to determine an alcohol concentration of a breath of an occupant of the vehicle;
   an image sensor mounted within the vehicle and configured to generate images of the occupant within the vehicle; and
   a processor communicatively coupled to the breath alcohol sensor and the image sensor, the processor being configured to determine whether the occupant is attempting to cheat the breath alcohol sensor, wherein the processor is programmed to:
      compare the alcohol concentration of the breath to a threshold,
      execute image processing on the images to identify a face of the occupant and determine that the occupant is not blowing or breathing into the breath alcohol sensor,
      execute image processing to determine, based on image processing on the images, that the occupant is not blowing or breathing into the breath alcohol sensor, and
      determine that the occupant is attempting to cheat the breath alcohol sensor based on (i) the comparison of the alcohol concentration of the breath to the threshold and (ii) the execution of the image processing indicating that the occupant is not blowing or breathing into the breath alcohol sensor indicating that the occupant is not blowing or breathing into the breath alcohol sensor during the comparison of the alcohol concentration of the breath to the threshold, and
      determine, based on image processing on the images, an image-based respiration rate of the occupant,
      wherein the determination that the occupant is not blowing or breathing into the breath alcohol sensor is based upon the image-based respiration rate of the occupant.

7. The system of claim 6, wherein the processor is further programmed to execute image processing on the images to identify a second face of a second occupant and determine that the second occupant is blowing or breathing into the breath alcohol sensor when the alcohol concentration of the breath is being compared to the threshold.

8. The system of claim 7, wherein the determining if the occupant is attempting to cheat the breath alcohol sensor is based on the determination that the second occupant is blowing or breathing into the breath alcohol sensor when the alcohol concentration of the breath is being compared to the threshold.

9. The system of claim 7, wherein the determination that the second occupant is blowing or breathing into the breath alcohol sensor is based on an orientation of the second face of the second occupant or a shape of a mouth of the second occupant.

10. The system of claim 6, wherein the determination that the occupant is not blowing or breathing into the breath alcohol sensor is based on an orientation of the face of the occupant or a shape of a mouth of the occupant.

11. The system of claim 6, further comprising a radar device configured to emit radio waves and receive reflected radio waves, wherein the processor is further programmed to:
    determine, based on processing of the reflected radio waves, a radar-based respiration rate of the occupant, and
    confirm, based on the radar-based respiration rate of the occupant, that the occupant is not blowing or breathing into the breath alcohol sensor when the alcohol concentration is being compared to the threshold.

12. The system of claim 6, further comprising a radar device configured to emit radio waves and receive reflected radio waves, wherein the processor is further programmed to:
    determine, based on processing of the reflected radio waves, a radar-based respiration rate of the occupant, and
    compare the radar-based respiration rate of the occupant with the image-based respiration rate,
    wherein the determining if the occupant is attempting to cheat the breath alcohol sensor is based on the comparison indicating the radar-based respiration rate does not align with the image-based respiration rate.

13. The system of claim 6, wherein the processor is programmed to inhibit driver operation of the vehicle by preventing starting of the vehicle or by preventing the vehicle from shifting into a DRIVE or REVERSE gear.

14. A computerized method for inhibiting a driver from cheating a vehicle breath alcohol sensor, the method comprising:

receiving a signal from a breath alcohol sensor mounted within a vehicle, wherein the signal indicates an alcohol concentration of a breath of an occupant of the vehicle;

comparing the alcohol concentration to a threshold;

receiving image data from an image sensor mounted within the vehicle, wherein the image data is associated with a field of view corresponding to a cabin of the vehicle;

identifying a face of an occupant in the vehicle via image processing on the image data;

determining that an object is in front of the face of the occupant via image processing on the image data;

determining, via image processing, that the occupant is not blowing or breathing into the breath alcohol sensor;

determining, via image processing, an image-based respiration rate of the occupant; and determining if the occupant is attempting to cheat the breath alcohol sensor based on the determination that an object is in front of the face of the occupant during the comparison of the alcohol concentration to a threshold and based on the image-based respiration of the occupant.

15. The method of claim 14, further comprising:

executing an object-recognition machine-learning model to determine the object is one of a balloon, tube, air filter, bottle, or a head of another occupant in the vehicle;

wherein the determining if the occupant is attempting to cheat the breath alcohol sensor is based upon the determination made by the object-recognition machine-learning model.

16. The method of claim 14, further comprising:

receiving radar data indicating a respiration rate of the occupant;

wherein the determining if the occupant is attempting to cheat the breath alcohol sensor is further based on the respiration rate of the occupant.

* * * * *